Feb. 2, 1943. H. KERSHAW 2,309,960
PHOTOGRAPHIC APPARATUS
Filed Feb. 28, 1941 3 Sheets-Sheet 1
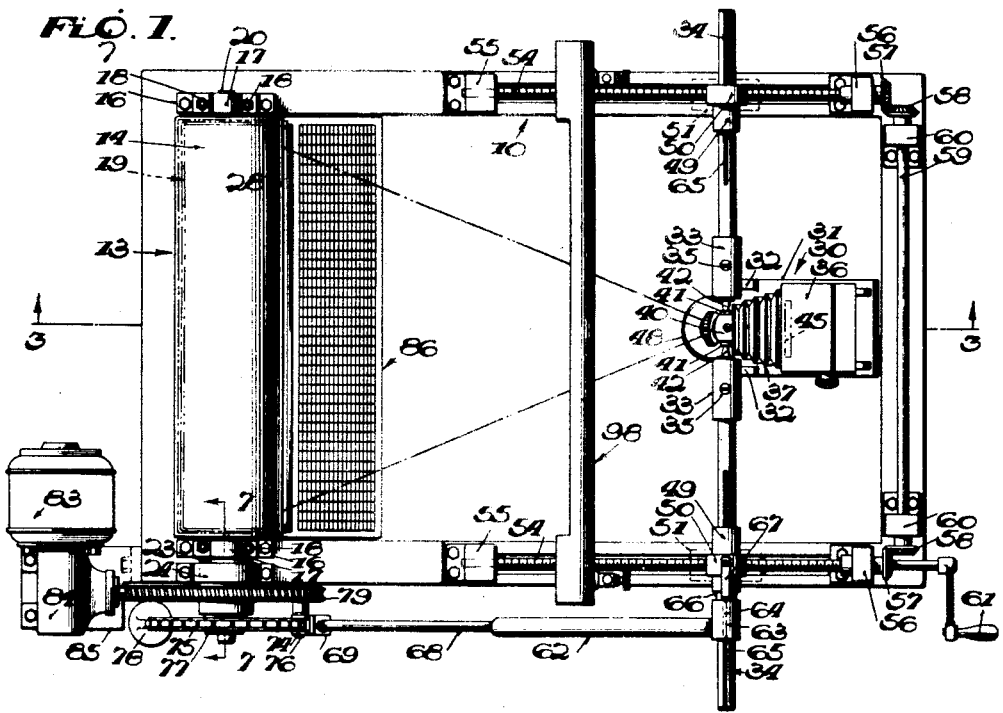
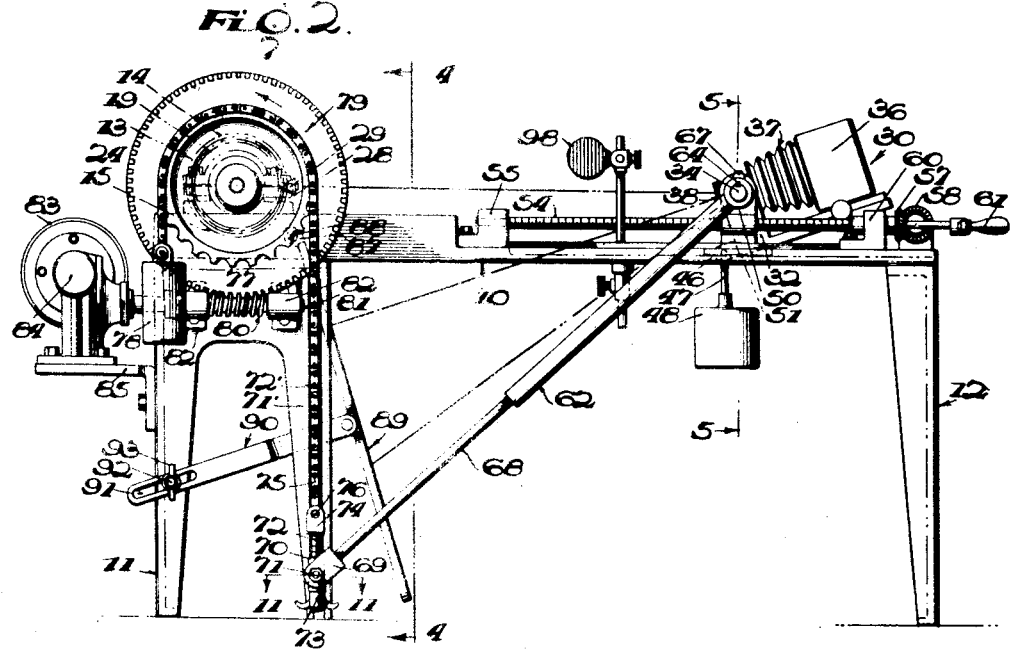
Inventor
Henry Kershaw
Attorney

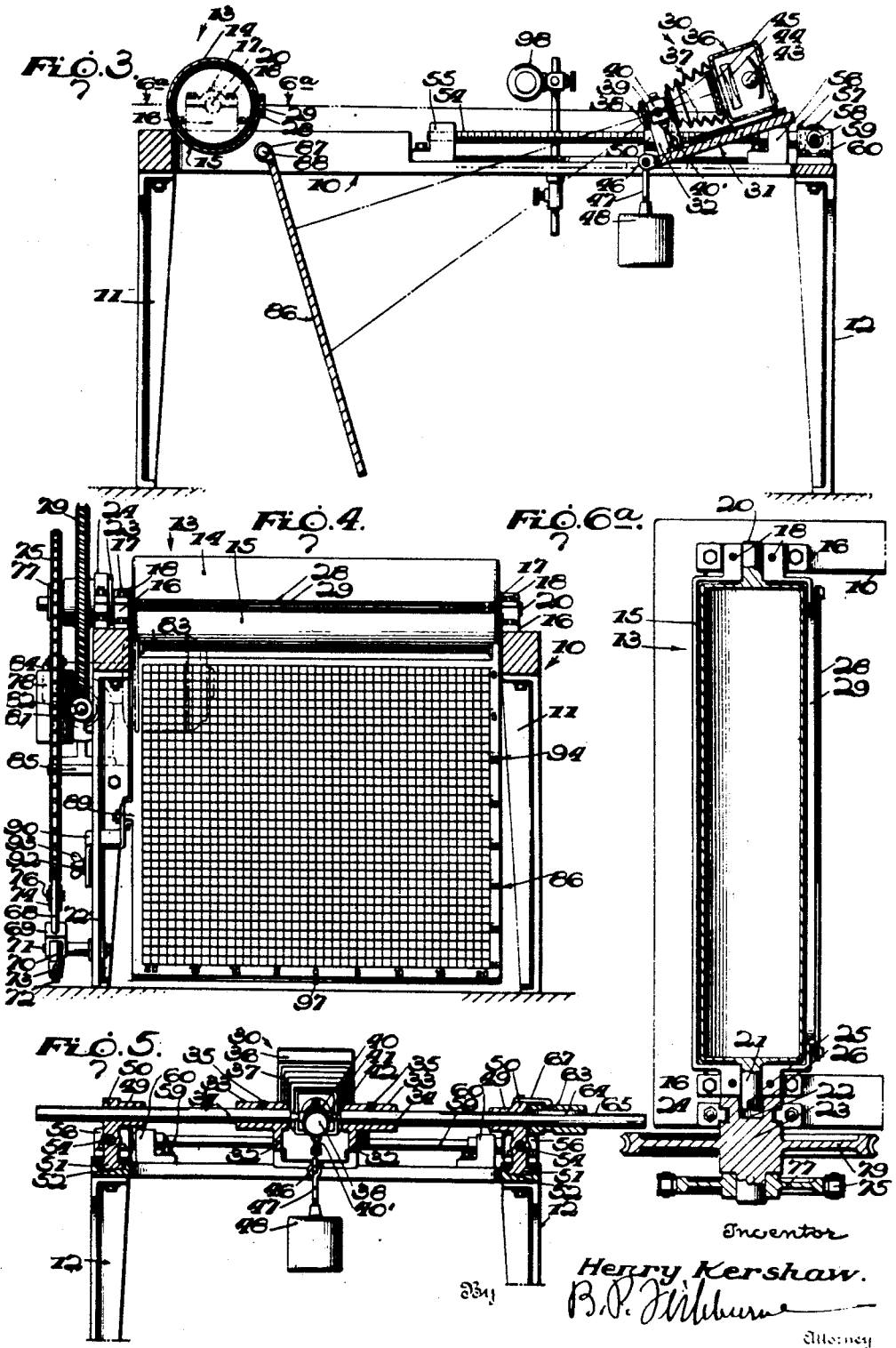

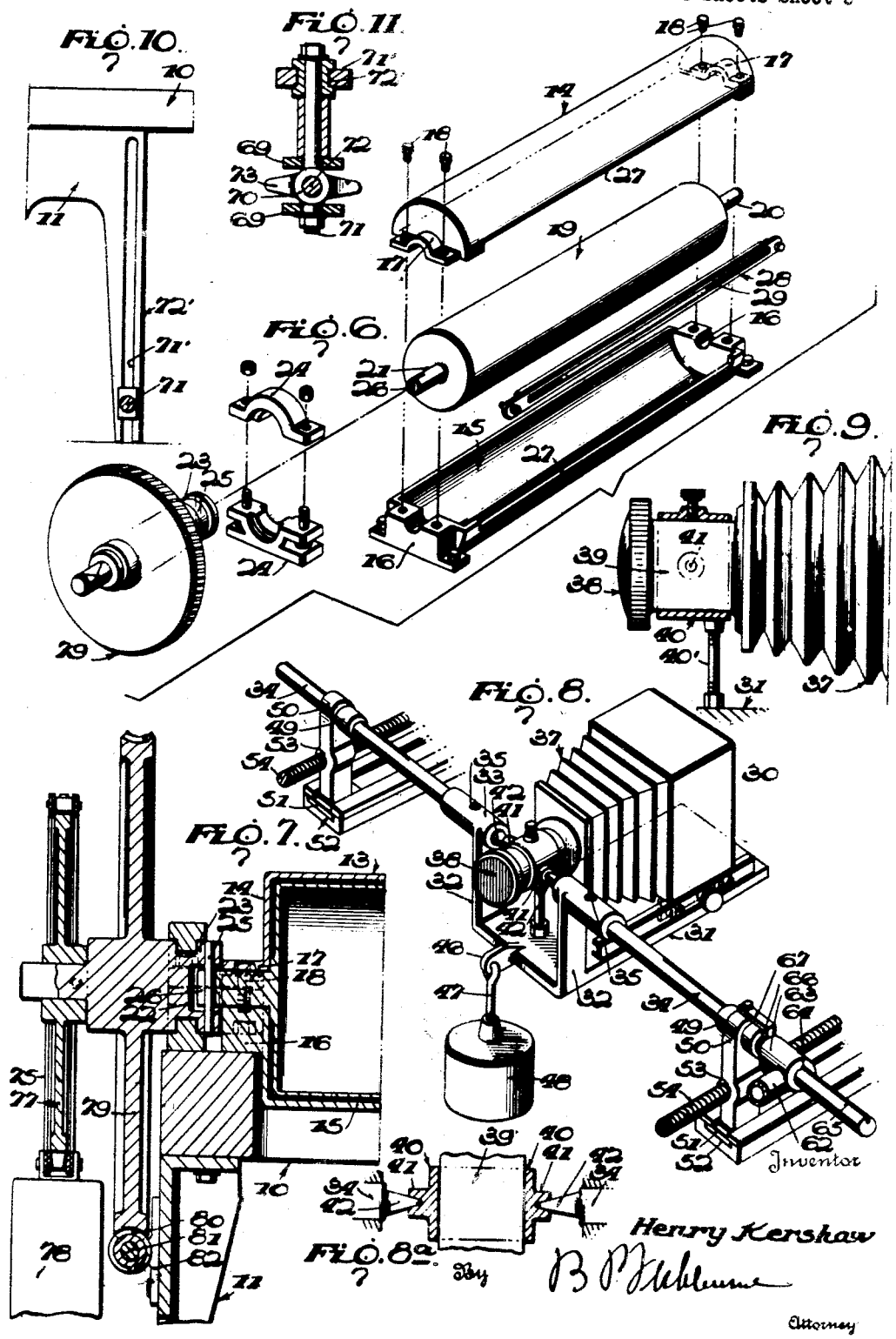

Patented Feb. 2, 1943

2,309,960

UNITED STATES PATENT OFFICE 2,309,960

PHOTOGRAPHIC APPARATUS

Henry Kershaw, Belleville, N. J.

Application February 28, 1941, Serial No. 381,113

9 Claims. (Cl. 88—24)

My invention relates to photographic apparatus and has particular reference to such apparatus which may be employed for transferring a design or image from a flat plate or film to a sensitized cylindrical surface or transferring the image from a cylindrical surface to a flat sensitized plate or film.

An important object of the invention is to provide means to measure the size of a design or object projected from a flat plate or film, so that the projected object may have its dimension properly adjusted to correspond to the entire circumference or periphery of a sensitized cylinder or roll, or any selected portion of such periphery.

A further object of the invention is to provide a screen which is graduated in units of length corresponding to known circumferential units of length of the periphery of the sensitized cylinder or roll, whereby the design or object may be projected upon the screen, and magnified to a selected size, depending upon whether it is desired that the design be applied to the entire circumferential area of the periphery of the sensitized cylinder or roll or a selected part thereof.

A further object of the invention is to provide a screen which is graduated longitudinally, in units of length corresponding to the known longitudinal units of length of the sensitized cylinder or roll, whereby the design or image may be projected upon the screen and properly magnified to cause the same to extend throughout the entire length of the sensitized cylinder or roll or a selected portion thereof.

A further object of the invention is to provide means to cause a projector or camera to turn about the optical center of its lens element, with the turning movement of the sensitized cylinder.

A further object of the invention is to provide means to cause the projected image to travel at the same speed as the surface speed of the sensitized roll.

A further object of the invention is to provide apparatus of the above-mentioned character which is adjustable for effecting the selected magnification of the projected design or image.

A further object of the invention is to provide apparatus of the above-mentioned character so constructed that the projector or camera is adjustable longitudinally of the coacting cylinder or roll, so that designs or images may be transferred to the cylinder or roll, in circumferential groups, and also staggered, if desired.

A further object of the invention is to provide apparatus of the above-mentioned character so constructed that separation negatives or positives may be properly produced upon sensitized cylinders or rolls which are to be used in the printing of colors.

A further object of the invention is to provide apparatus of the above-mentioned character wherein the projector or camera may be independently focused to produce a sharp image.

Other objects and advantages of the invention will be apparent during the course of the following description.

In the accompanying drawings forming a part of this application and in which like numerals are employed to designate like parts throughout the same, Figure 1 is a plan view of apparatus embodying my invention, Figure 2 is a side elevation of the same, Figure 3 is a vertical longitudinal section taken on line 3—3 of Figure 1, Figure 4 is a transverse vertical section taken on line 4—4 of Figure 2, Figure 5 is a similar view taken on line 5—5 of Figure 2, Figure 6ᵃ is a horizontal section taken on line 6ᵃ—6ᵃ of Figure 3, Figure 6 is an exploded perspective view of the sensitized cylinder or roll and associated elements, Figure 7 is a fragmentary transverse vertical section taken on line 7—7 of Figure 1, Figure 8 is a perspective view of the projector and supporting means, Figure 8ᵃ is a detailed section through the bearing of the lens holding ring, Figure 9 is a fragmentary side elevation of the projector, the lens holding ring being in vertical section, Figure 10 is a side elevation of a guide element or leg, parts omitted, and parts in section, and, Figure 11 is a horizontal section taken on line 11—11 of Figure 2.

The apparatus comprises a horizontal bed 10, supported by legs 11 and 12. The apparatus further comprises a preferably cylindrical dark room or housing 13, comprising upper and lower companion semi-cylindrical sections 14 and 15, which are separable. The lower section 15 may be permanently mounted upon the bed 10 and this lower section is provided at its opposite ends with bearing sections 16, bolted or otherwise attached to the bed. The upper section 14 is provided at its ends with coacting bearing sections 17. The bearing sections 16 and 17 form horizontally split bearings and the bearing sections 17 are removably held upon the bearing sections 16 by screws 18 or the like. The dark room or housing 13 is adapted to receive a sensitized cylinder 19, carrying trunnions 20 and 21 at its ends. The trunnion 20 is rotatably held within the bearing sections 16 and 17 and the trunnion 21 is rotatably held within the opposite bearing sections 16 and 17 and extends beyond the same, to enter an opening 22 in the sleeve or coupling 23. This sleeve or coupling is rotatably held within a bearing 24, rigidly attached to the bed 10. The trunnion 21 rotates with the sleeve or coupling 23 and is attached thereto by a pin 25, extending through openings in the sleeve 23 and a slot 26 in the trunnion 21, whereby the cylinder 19 is driven by the sleeve or coupling 23. The sensitized cylinder 19 is to be removed and this is effected by removing the upper housing section 14, after which the sensitized cylinder 19 may be removed from within the lower housing section 15 and separated from the driving sleeve or coupling 23.

The housing sections 14 and 15 are provided at their meeting edges with a longitudinal slot 27 for receiving an elongated guard 28, having a light slot 29. This guard is adjustable within the slot 27 toward and from the sensitized cylinder 19 and the inner end of the guard is arranged in close relation to the sensitized cylinder but does not contact therewith. Sensitized cylinders of different diameters may be employed, and the guard 28 is adjustable so that it may be brought into close relation to the peripheries of sensitized cylinders of different diameters.

Arranged near and above the bed 10 is a projector 30 of any well known or preferred type. This projector comprises a base or table 31, having arms 32 rigidly secured thereto and projecting above the same at substantially a right angle thereto. These arms are provided at their upper or free ends with sleeves 33 receiving the ends of shaft sections 34 and the sleeves are clamped or locked to these shaft sections by set screws 35 or the like. The base 31 has the housing or body portion 36 of the projector mounted thereon and the housing 36 carries the part or bellows 37 to which the lens element 38 is attached. This lens element comprises the usual tube 39 carrying lens or lenses and the tube 39 is equipped with a ring 40, rigidly secured thereto, and this ring has diametrically oppositely arranged conical recesses 41, to receive conical extensions 42 of the shaft sections 34. The ring 40 is rigidly secured to a rod 40', which is rigidly mounted upon the base or table 31, so that the lens unit and base turn as a unit. The central longitudinal axes of the shaft sections 34 are in alignment with the optical center of the lens element 38, and as the projector is swung in unison with the sensitized cylinder, as will be explained, the projector turns about the optical center of the lens element as an axis. The projector includes a source of light 43, a screen 44 and has means to receive and hold a flat film or plate 45, such as photographic negatives or positives upon which the design or image appears. The housing 36 is mounted upon the base 31, as stated, and is adjustable longitudinally of the base 31 toward and from the lens 38 so that the design or image may be brought into focus with the lens or out of focus therewith as desired.

The base 31 is provided upon the side of the shaft sections 34 remote from the projector with knuckles or lugs 46, to which is attached a link 47, carrying a weight 48. This weight is heavier than the base 31 and the projector carried thereby.

The shaft sections 34 are rotatably mounted within bearings 49 carried by brackets 50, having bases 51. These bases are mounted to slide within longitudinally guide ways 52, formed in the bed 10. The brackets 50 have screw-threaded openings 53, for receiving and engaging screw-threaded rods 54 having right and left screw threads. The forward ends of the screw-threaded rods 54 are held within stationary bearings 55 while their rear ends are held within stationary bearings 56. The rods 54 are free to turn upon their longitudinal axes but cannot move longitudinally. When the rods 54 are rotated they shift the brackets 50 longitudinally of the bed 10. In order that the screw-threaded rods 54 may turn in unison, these rods are provided at their rear ends with beveled gears 57, rigidly secured thereto, engaging beveled gears 58, carried by a transverse shaft 59, journaled in stationary bearings 60. One rod 54 extends rearwardly beyond its beveled gear and is provided with a hand crank 61, by means of which it may be turned. It is thus apparent that the base or table 31 is bodily shiftable toward and from the sensitized roll, to regulate the magnification of the design or image. The base or table 31 is also shiftable transversely of the bed 10 or longitudinally of the sensitized roll, since the shaft sections 34 are longitudinally movable within the bearings 60.

Means are provided for connecting one shaft section 34 with the sensitized roll so that the projector and sensitized roll turn in unison, but such connection does not interfere with the longitudinal and transverse adjustments of the projector. This means comprises a tubular crank 62, having a sleeve 63, slidably mounted upon the adjacent shaft section 34. The sleeve carries a key 64, which enters a groove 65 formed in the shaft section. The sleeve 63 has an annular groove 66, receiving a stationary finger 67, rigidly secured to the adjacent bracket 50. It is thus seen that the tubular crank 62 turns with the shaft section 34 but the shaft section may be moved longitudinally within the sleeve 63, which is held against longitudinal movement by the finger 67. Telescoping with the tubular crank 62 is a connecting rod 68, to the free or lower end of which is rigidly secured a forked head 69. This forked head straddles a block 70, and is pivotally connected therewith, at 71. This block has a screw-threaded opening to receive a screw-threaded bolt 72, provided at its lower end with a winged head 73. A pin or pivot 71 moves in a straight vertical path, since it operates within a vertical slot 71' formed in a stationary guide element or leg 72', which may be cast integral with the adjacent leg 11. The upper end of the bolt is swiveled to a forked coupling 74, attached to a sprocket chain 75, as shown at 76. This sprocket chain is passed over a sprocket wheel 77 and carries at its free end a weight 78. The weight 78 functions to retain the sprocket chain in place upon the sprocket wheel 77 while the weight 48 functions to over-balance the projector and the base or table 31, whereby the connecting rod 68 is urged downwardly and retains that portion of the sprocket chain 75 between the sprocket wheel 77 and the rod 68, taut, thus preventing any slack in the sprocket chain and resultant lost motion between the sensitized roll and the projector, during their movement. The sprocket wheel 77 is rigidly secured to a worm wheel 79, to rotate therewith, and this worm wheel is rigidly secured to the sleeve or coupling 23, to rotate therewith. The worm wheel is driven by a worm 80, formed upon a shaft 81, journaled in stationary bearings 82. The worm 80 is driven by a motor 83 through the medium of reduction gearing 84. The motor and gearing are mounted upon a bracket 85, in turn mounted upon one leg 11, as shown.

The numeral 86 designates a screen upon which a design or image may be projected as is well known in the art. This screen may be formed of any suitable material. The screen is arranged near and beneath the sensitized roll 19 and upon that side thereof adjacent to the slot 29. The rear surface of the screen upon which the design or image is projected is in a plane which is at a tangent to the periphery of the sensitized roll 19. The screen 86 is supported so that it may be angularly adjusted and for this purpose it is provided near its top with apertured knuckles 87, receiving fixed pivots 88, secured to the bed 10. Near its lower end, the screen 86 is provided with a knuckle 89, pivotally connected with a link 90, having an elongated slot 91, receiving a fixed bolt 92, carried by the leg 11, the bolt 92 carrying a winged clamping nut 93. It is thus seen that the screen 86 may be angularly adjusted so that it is parallel with the plate or film 45 carrying the design or image, and then locked in this selected adjusted position. In order that the image be properly focused upon the screen, such screen must be parallel with the plate or film 45. The screen 86 is provided with a transverse scale 94, graduated in any suitable units of length, such as inches. This scale runs from "0" at the top to "35" at the bottom, but it may be varied. The horizontal lines show the graduations in inches. The screen 86 is provided at its lower longitudinal edge with a longitudinal scale 97, graduated in units of length, such as inches, and the scale is in multiples of five. The vertical lines indicate inches. The complete length of the scale 97 corresponds to the length of the slot 29. The numerals in the scale 97 preferably start at the center with "0" and increase in opposite directions, as shown.

The operation of the apparatus is as follows:

The flat price or film 45 carrying the design or image, negative or positive, is inserted into the projector and the bulb 43 is set into action so that the image is entirely projected upon the screen. 86. The housing 36 may be adjusted toward or from the lens element 38 to produce a sharp image. If the image projected upon the screen 86 is not sharp throughout its entire area, it is because the screen is not parallel with the plate or film 45 and this is corrected by bringing the screen into parallel relation with the plate or film. The circumferential dimension and the length of the sensitized roll is known, and for the purpose of illustration the circumferential dimension may be thirty inches while the length may be fifty inches. The image projected upon the screen must therefore be magnified until its circumferential dimension is thirty inches as read upon the vertical scale 94. The extent of magnification of the projected image is regulated by turning the crank 61 to bring the projector toward or from the sensitized roll and the sharpness of the projected image is obtained by adjusting the distance between the plate or film and the lens. The projected image having a transvers or vertical dimension of thirty inches will extend entirely around the circumference of the sensitized roll, and will also extend longitudinally of the sensitized roll, throughout its entire length, or a portion thereof, depending upon the horizontal length of the image as may be read upon the scale 97.

Having thus projected the image upon the screen 86 and determined its transverse and horizontal dimensions, the chain 75 is removed from the sprocket wheel 77 and is employed to swing the connecting rod 68 upwardly so that the upper edge of the projected image is in substantial alignment with the lower edge of the slot 29 and the sprocket chain 75 is again applied to the sprocket wheel 77. The bolt 72 may now be turned to effect a fine adjustment so that the top edge of the projected image will be in precise alignment with the lower edge of the slot 29. The projector is now in the proper downwardly inclined starting position and the light 43 is now extinguished. The upper housing section 14 is removed and the sensitized roll 19 of the known circumference and length is placed within the lower housing section 15 and the upper housing section is returned upon the lower housing section and secured thereto. The light 43 is again turned on and the motor 83 is started. The sensitized roll 19 is now turned slowly counterclockwise, while the projector is turned in unison therewith, in a clockwise direction, as shown by the arrows in Figure 2. The movement of the roll and projector is slow. The image is projected through the slot upon the sensitized roll and as the image gradually rises the sensitized roll has its periphery rising, and the speed of the projected image is the same as the surface speed of the sensitized roll. The complete image is therefore projected upon the sensitized roll and will extend throughout the entire circumference of the roll, since the vertical length of the image is the same as the circumferential length of the sensitized roll, in the present case.

It may be desired to project a design or image upon only a portion of the circumference of a roll. The transverse or vertical length of the image can be first determined by projecting the image upon the screen 86 and reading along the scale 94. Two or more images may be projected in transverse alignment about the circumference of the roll. Further, it may be desired to project an image throughout the entire circumference of the sensitized roll, or throughout a portion of such circumference, but only throughout a portion of the length of the sensitized roll. Hence, the longitudinal dimension of the design or image is measured by projecting the same upon the screen 86 and reading along the scale 97. The projector is adjusted transversely of the bed 10 or longitudinally of the sensitized roll so that the image or images are only projected upon the circumference of the sensitized roll throughout a portion of its length. These different images may be staggered, if desired. Further, the apparatus may be employed to project images upon sensitized cylinders for use in color printing. The negative would first be inserted in the projector and the size of the projected image ascertained by projecting the same upon the screen 86. This would enable the operator to ascertain the correct size of the projected image to be used in connection with the sensitized roll of a pre-determined size. The same adjustment of the apparatus would be retained for use in connection with the separation negatives when they were projected upon a series of sensitized rolls of the same size.

After the sensitized roll, in each case, has made a complete revolution and the image has been projected thereon, the light 43 is extinguished and the sensitized roll is removed from the housing and is treated in the usual manner for its further development.

The sprocket chain 75 may again be separated from the sprocket wheel 77 and employed to lower the connecting rod 68 so that the projector will again be arranged to project the image upon the screen 86, should it be desired to ascertain the dimensions of the image, and the sprocket chain may then be returned to the sprocket wheel for holding the projector in this adjustment.

I also contemplate using the apparatus for transferring an image from a roll or curved surface to a flat plate or film. Practically the same apparatus is used. The projector will then function as a copying camera and the light 43 will remain turned off while a sensitized plate or film will be substituted for the negative 45. The projector then functions as a copying camera and would be equipped with a cap or shutter. I would then use a source of light 98, such as a Cooper Hewit tube. This light would be projected through the slot 29 and would illuminate the adjacent portion of the image previously formed upon a roll corresponding to the roll 19. As this roll gradually turned counterclockwise, the copying camera would gradually turn clockwise, and the image on the curved surface would be transferred to the flat sensitized plate or film in the camera. The camera would, of course, be properly adjusted toward or from the rotating roll to properly control the size of the negative being formed, and the camera would also be focused to produce a sharp image.

It is to be understood that the form of my invention herewith shown and described is to be taken as a preferred example of the same and that various changes in the shape, size, and arrangement of parts may be resorted to without departing from the spirit of my invention or the scope of the subjoined claims.

Having thus described my invention, what I claim is:

1. In photographic apparatus, a supporting structure, a movable design carrier mounted upon the supporting structure, a lever connected with the design carrier to move it, a wheel connected with the supporting structure, a flexible element passed about the wheel and having one end connected with the lever, a weight connected with the opposite end of the flexible element, the arrangement being such that the flexible element may be readily separated from the wheel, and means to project the design.

2. In photographic apparatus, a supporting structure, a support mounted upon the supporting structure and movable transversely and also longitudinally of the supporting structure, a design carrier pivotally mounted upon the support and angularly adjustable with relation thereto, a longitudinally extensible lever connected with the design carrier to angularly adjust the same and having a free end, guide means for the free end of the lever, and operating means connected with the free end of the lever.

3. In photographic apparatus, a support, carriages having bearings and mounted upon the support to be shifted longitudinally thereof, a shaft extending transversely of the support and pivotally mounted in the bearings, a design carrier mounted upon the shaft to turn therewith, a lever connected with the shaft to turn it, operating means connected with the lever, and means to project the design.

4. In photographic apparatus, a support, a carriage mounted upon the support to be shifted with relation thereto and having a bearing, means to shift the carriage, a shaft held within the bearing and adjustable transversely of the movement of the carriage, a design carrier mounted upon the shaft to turn therewith, a lever connected with the shaft to turn it, operating means connected with the lever, and means to project the design.

5. In photographic apparatus, a supporting structure, a support mounted upon the supporting structure and movable longitudinally thereof, means to move the support longitudinally of the supporting structure, a design carrier, means to pivotally mount the design carrier upon the support so that the design carrier may turn to selected angular positions with relation to the support, means to effect the turning movement of the design carrier including a longitudinally extensible lever having a free end, guide means associated with the free end of the lever, operating means connected with the free end of the lever, and means to project the design.

6. In photographic apparatus, a support, shafts disposed in end-to-end relation and pivotally mounted upon the support to turn upon their longitudinal axes with relation thereto, the inner ends of the shafts being spaced and the shafts having their central longitudinal axes in alignment, a photographic device mounted upon the shafts to turn with one shaft, said photographic device embodying a lens element including a tube arranged between the inner ends of the shafts, said tube having means for connection with the inner ends of the shafts, said lens element having its optical center in alignment with the central turning axes of the shafts, and means to turn one shaft.

7. In photographic apparatus, a support, bearings carried by the support, shafts mounted in the bearings and disposed in end-to-end relation and having their inner ends spaced, said shafts having their central turning axes in alignment, a table arranged near and beneath the inner ends of the shafts and having upstanding arms, means to connect the upstanding arms with the inner portions of the shafts, a photographic device mounted upon the table and including a lens element embodying a tube, said tube being arranged between the inner ends of the shafts and provided with devices to receive the inner ends of the shafts, the lens element having its optical center in alignment with the central turning axes of the shafts, and means to turn one shaft.

8. In photographic apparatus, a support, bearings mounted upon the support, shafts arranged in end-to-end relation and having their inner ends spaced and their central turning axes in alignment, said shafts being mounted in said bearings, a table arranged near and beneath the inner ends of the shafts and having means for connection with the inner ends of the shafts so that the table swings when one shaft is turned, a photographic device mounted upon the table and including a lens element embodying a tube arranged between the inner ends of the shafts, a holder for the tube provided with oppositely arranged sockets to receive the inner ends of the shafts, the lens element having its optical center in alignment with the central turning axes of the shafts, means to mount the holder upon the table, a weight tending to turn the table in one direction.

and a lever connected with one shaft to turn the same.

9. In photographic apparatus, a generally horizontal supporting structure, bearings mounted upon the supporting structure to be shifted longitudinally thereof, screw-threaded shafts connected with the supporting structure and engaging the bearings to shift them longitudinally of the supporting structure, means to move the screw-threaded shafts in unison, shafts slidably mounted in the bearings and disposed in end-to-end relation and having their inner ends spaced and their turning axes in alignment, a table mounted near and beneath the inner ends of the shafts and having arms, means to connect the arms with the inner ends of the shafts, a photographic device mounted upon the table and including a lens element, said lens element embodying a tube, said tube being provided with oppositely arranged sockets to receive the inner ends of the shafts, the lens element having it optical center in alignment with the turning axes of the shafts, a lever mounted upon one shaft to turn it, and means to move the lever.

HENRY KERSHAW.